United States Patent [19]

Nichols

[11] 4,193,569

[45] Mar. 18, 1980

[54] PROCESS AND APPARATUSES FOR LANDING AIRCRAFT ON WATER COVERED LANDING SURFACES

[76] Inventor: William B. Nichols, Apt. #102, 2700 SW. 16th, Amarillo, Tex. 79102

[21] Appl. No.: 834,646

[22] Filed: Sep. 19, 1977

Related U.S. Application Data

[63] Continuation of Ser. No. 657,557, Feb. 12, 1976, abandoned.

[51] Int. Cl.$^2$ .................. B61D 47/00; B64D 33/04
[52] U.S. Cl. .................. 244/100 R; 239/265.29; 244/1 R; 244/110 B
[58] Field of Search .............. 244/1 R, 100 R, 103 R, 244/110 B; 239/265.27, 265.29, 265.31, 265.33, 265.35, 265.37

[56] References Cited

U.S. PATENT DOCUMENTS

| | | | |
|---|---|---|---|
| 3,339,865 | 9/1967 | Nettles | 244/103 R |
| 3,493,198 | 2/1970 | Roed | 244/110 B X |
| 3,724,759 | 4/1973 | Ellis | 239/265.29 |
| 3,739,582 | 6/1973 | Maison | 239/265.29 X |

OTHER PUBLICATIONS

"McDonnell Douglas DC-8", *Jane's All the World's Aircraft*, 1969–1970, 8/1970, pp. 376–379.

*Primary Examiner*—Barry L. Kelmachter
*Attorney, Agent, or Firm*—Ely Silverman

[57] ABSTRACT

Process of landing an airplane on a solid landing surface covered with a layer of water comprising the steps of forming and maintaining a curtain of gas from a point forward and outboard of each of the landing wheels of an airplane on each side of the fuselage thereof to a point forward and central of the wheels and thereby displacing the water of the layer of water from the path of those landing wheels on that solid surface and later releasing the water from the curtain of gas at points lateral of each of the landing wheels while moving the gas curtain and airplane forward at a sufficiently high rate of speed to maintain the landing wheels in contact with the dry surface. Structural modifications of conventional cascade type thrust reversers and target type thrust reversers are provided to accomplish the steps of such process.

9 Claims, 34 Drawing Figures

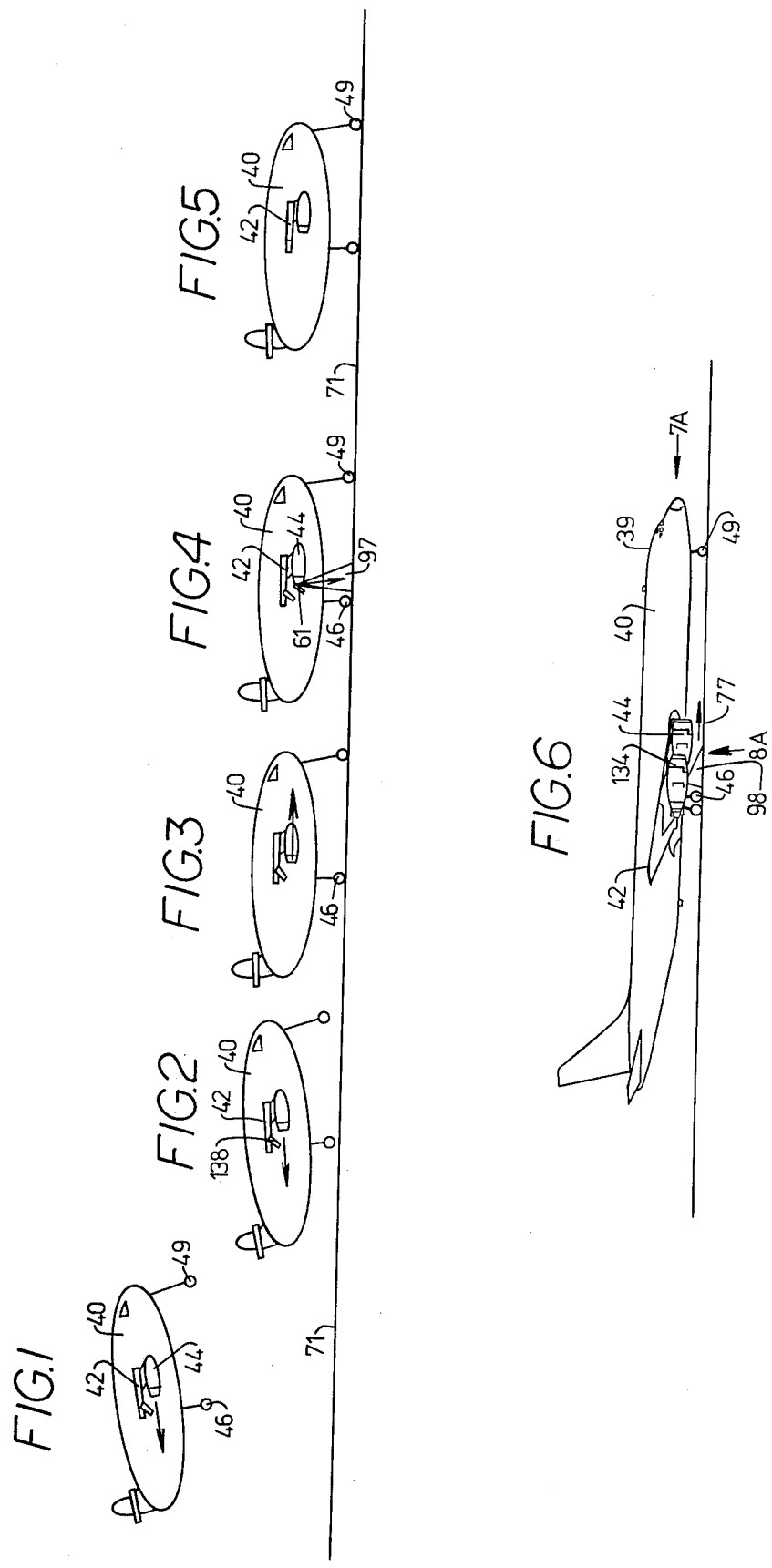

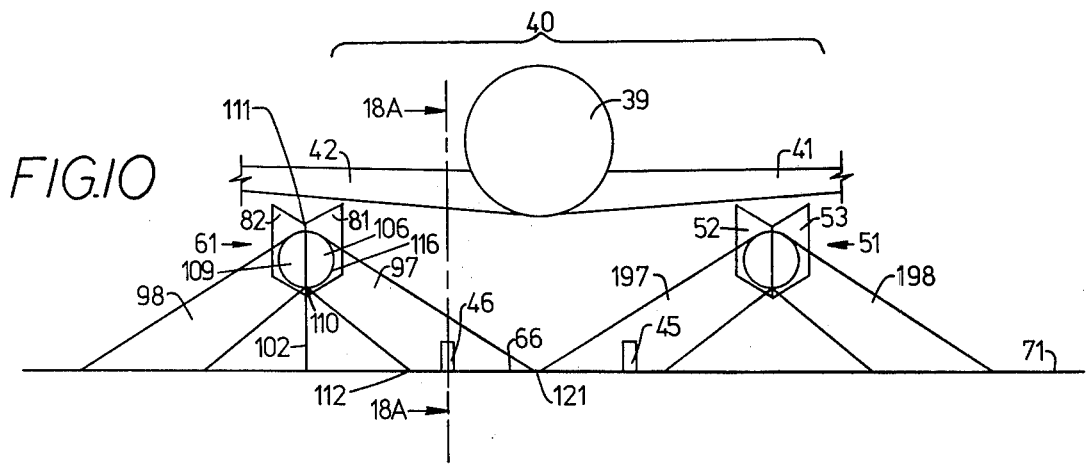
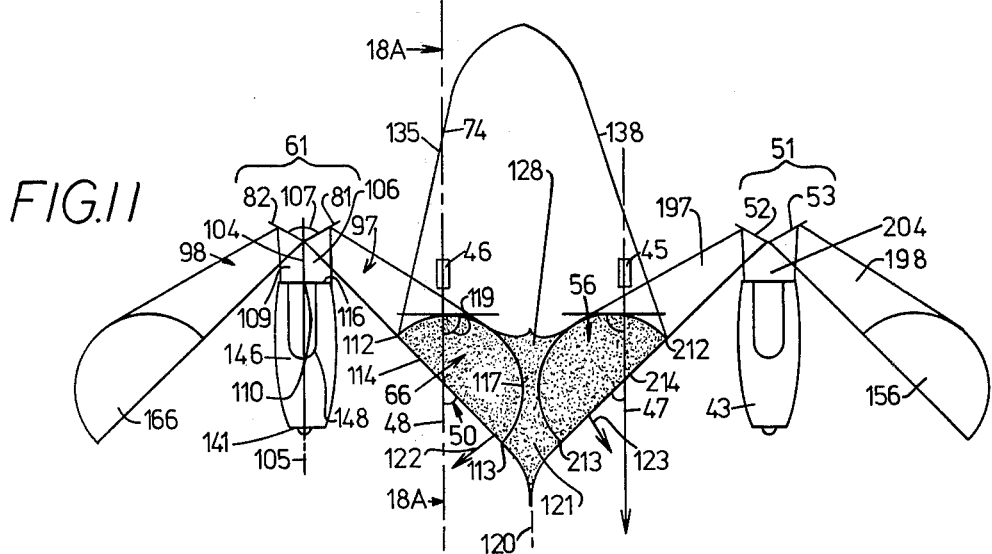
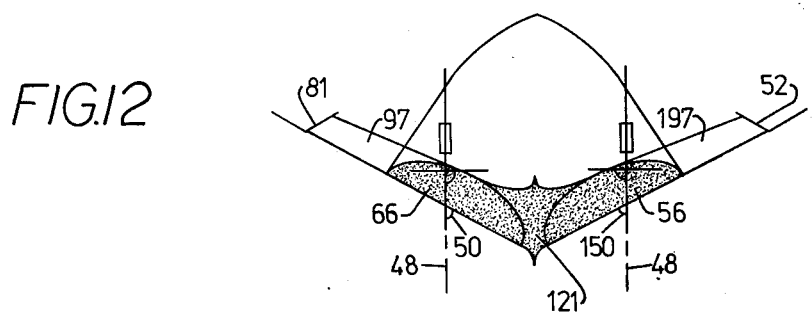

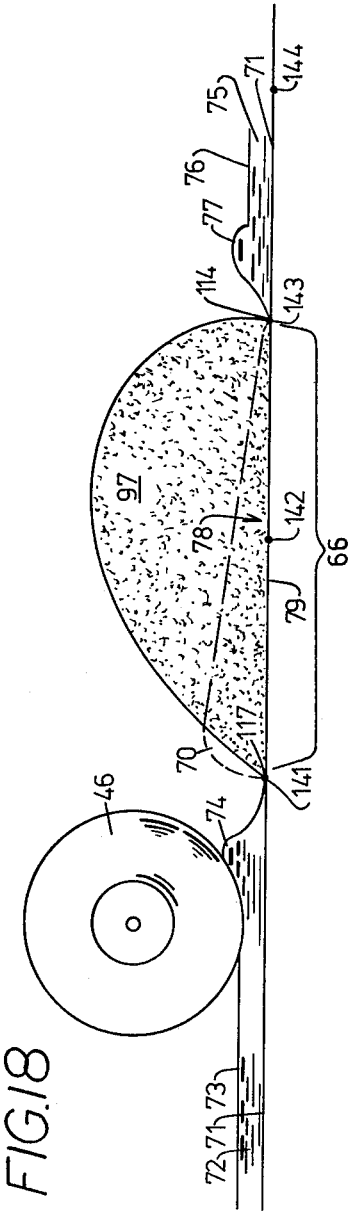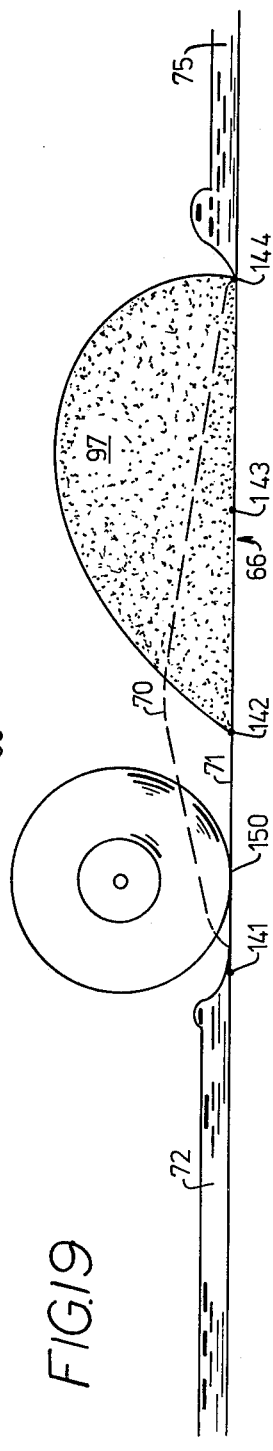
FIG.18
FIG.19
FIG.20

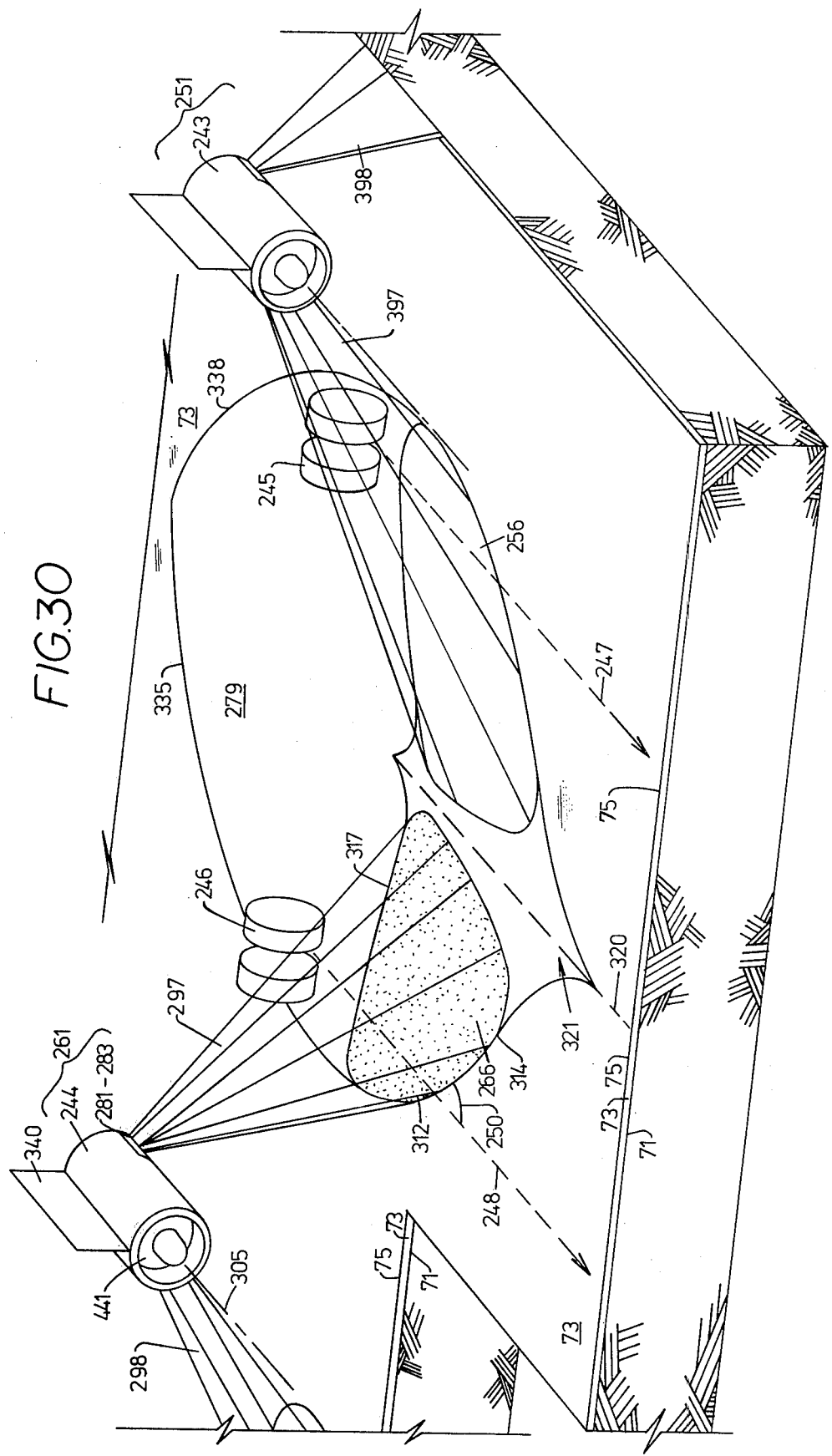

PROCESS AND APPARATUSES FOR LANDING AIRCRAFT ON WATER COVERED LANDING SURFACES

This is a continuation of application Ser. No. 657,557 filed Feb. 12, 1976, now abandoned.

BACKGROUND OF THE INVENTION

The field of art to which this invention relates is aircraft landing gear.

PRIOR ART

The problem of hydroplaning during landing on a wet airplane runway landing surface remains such a risk of physical harm to fliers and airplane and airplane passengers that the economical loss due to inconvenience of delayed landing and arrival schedule and altered landing locations is presently tolerated notwithstanding that thrust reversers have been available for a substantial time as in U.S. Pat. No. 2,866,610 and the teaching of balancing and directional control of non-axial turbine exhaust gas streams (e.g. U.S. Pat. No. 3,106,372) is known.

DESCRIPTION OF THE DRAWINGS

FIGS. 1-5 diagrammatically show successive stages in landing of an aircraft equipped according to the apparatuses and system of this invention on a water covered runway as seen along plane 1A of FIGS. 7 and 8. FIG. 1 is a stage in landing approach with flaps down; FIG. 2 shows the first touchdown stage of landing of the airplane with flaps down; FIG. 3 shows the thrust reversers activated; FIG. 4 shows the dewatering apparatus operating and FIG. 5 shows the aircraft stopped.

FIG. 6 is a scale side view of an airplane equipped according to one embodiment of this invention as seen along direction of arrow 6A of FIGS. 7 and 8 to show the position of the outboard gas stream 98 as observed in the vertical plane.

FIG. 9B generally illustrates parts of a jet engine motor, as 44, and its frame which motor and frame are also used in embodiment of FIGS. 13-16B. FIG. 9B illustrates a different embodiment of jack assembly for the deflector plates 181 and 182 than is used in FIGS. 13-16B and illustrates those structures in their landing operative mode, i.e., the position thereof for forming impingement zones, as 66 and 166.

FIG. 10 is an enlarged diagrammatic view of zone 10A of FIG. 7 in part through a vertical plane passing through the jet exhausts 104 and 204 immediately in back of engines 43 and 44 with remaining parts of this FIGURE on each side of the exhausts 104 and 204 as seen through vertical plane 10B-10B of FIG. 8. Exhausts 104 and 204 are shown in FIG. 11.

FIG. 11 is a diagrammatic top plan view of structures shown in FIG. 10A and to the same scale: this is an enlarged and reversed view of the central part of FIG. 8.

FIG. 12 is a diagrammatic view as in FIG. 11 in another arrangement of impingement zones according to this invention.

FIGS. 13-16 diagrammatically illustrates successive stages of positioning of components in operation of apparatus according to this invention. FIG. 13 illustrates flight operating mode of an engine and deflector assembly.

FIGS. 13, 14A, 15A and 16A are diagrammatic top and rear perspective views of the right inboard engine 44. FIGS. 14B, 15B and 16B are bottom views of the apparatus of FIGS. 14A-16A along direction of arrow 13B of FIG. 13 of the corresponding apparatus of FIG. 13 in position of its parts shown in FIGS. 14A, 15A and 16A, respectively.

FIG. 18 is a diagrammatic longitudinal vertical sectional view along the vertical plane 18A—18A of FIG. 11 during the initial stage of operation of deflector assemblies 51, 61, 251 & 261.

FIG. 19 is a diagrammatic longitudinal vertical sectional view along plane 18A—18A of FIG. 11 generally as in FIG. 18 and shows a stage in landing operation shortly subsequent to that stage shown in FIG. 18.

FIG. 20 is a diagrammatic longitudinal vertical sectional view along plane 18A—18A of FIG. 11 generally as in FIGS. 18 and 19 and shows a stage in operation shortly subsequent to that shown in FIG. 19.

In FIG. 25 the gas clearing stream deflector plates are shown closed and the thrust reverser plates are shown in operative position

FIG. 30 is a diagrammatic oblique dimetric view of clearign gas streams, engines, deflector plates, runway surface, gas impingment zones and aircraft landing wheels according to the process of this invention applied to the apparatus shown in FIGS. 21-29.

The terms "left" and "right" and "front" and "back" and "inboard" and "outboard" refer to the directions as sensed by a pilot facing forward and seated in the pilot's compartment at the front of the fuselage 39 and 239 of plane 40 and 240, respectively.

DESCRIPTION OF THE PREFERRED EMBODIMENTS

Figure 7:
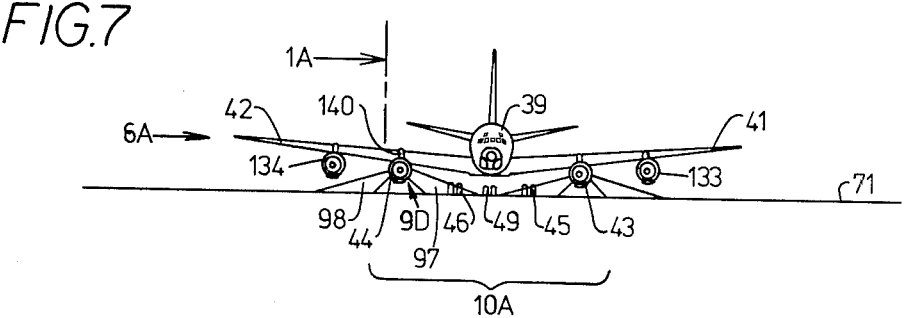
FIG. 7 is an overall front scale view along arrow 7A of FIGS. 6 and 8 to show the position of two clearing gas streams as observed in the vertical plane from the front of the aircraft.
Figure 8:
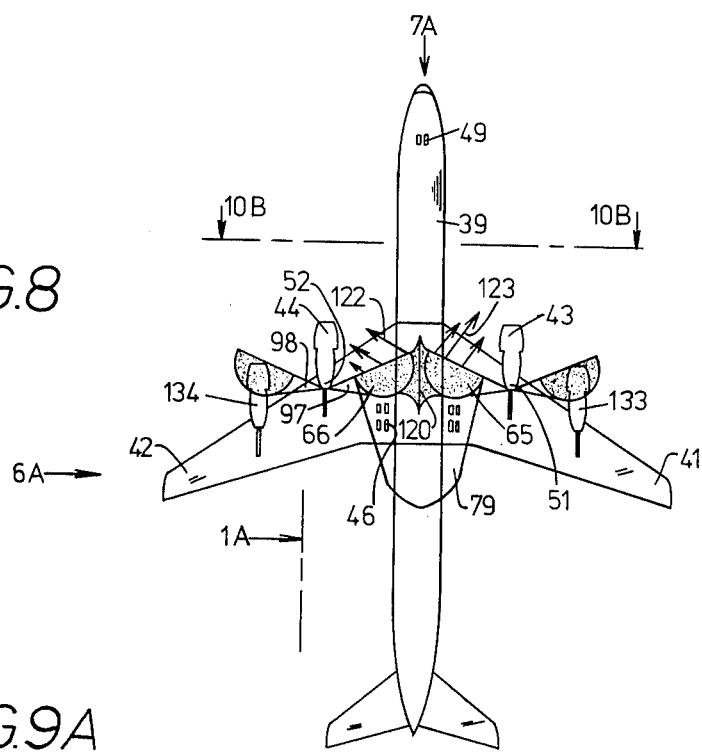
FIG. 8 is a bottom view taken in the direction of the arrow 8A of FIG. 6.

FIGS. 6, 7 and 8 are drawn to scale and to the same scale to show the relations of the positions of the apparatus herein described on the airplane 40 and Table I sets out the particular dimensions of the exemplary airplane 40.

Figure 16A:
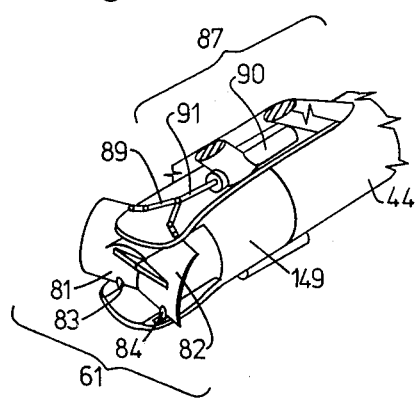
FIGS. 16A and 16B show the plates locked in rotated position for transverse blast stream extension.
Figure 16B:
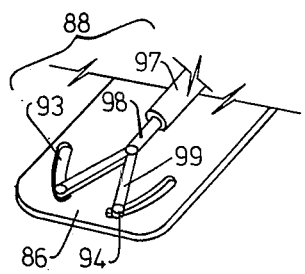
Figure 17:
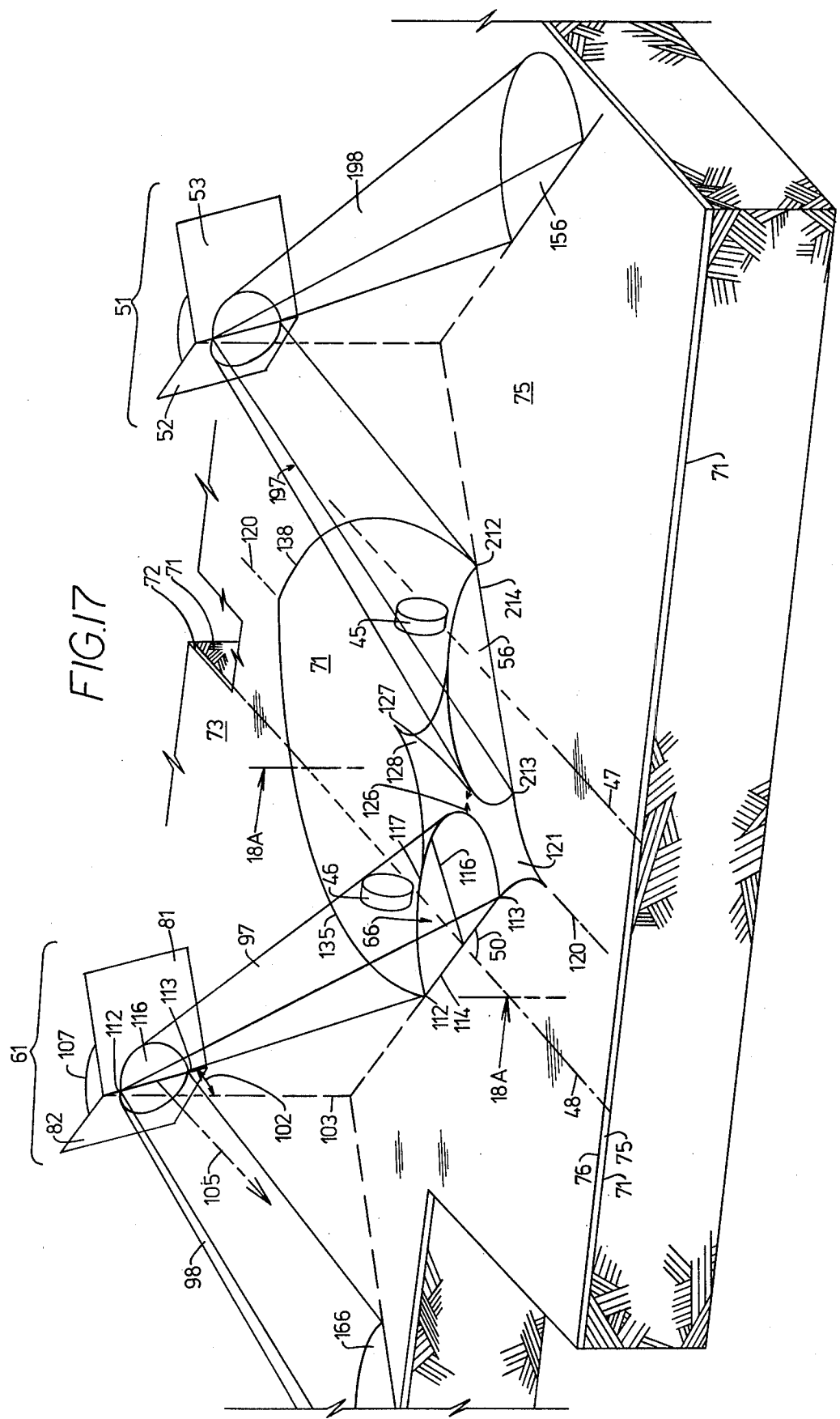
FIG. 17 is a diagrammatic oblique dimetric view of clearing gas streams, deflector plates therefor, runway surface, gas impingement zones and aircraft landing wheels according to this invention as shown in FIGS. 6-16B.

Broadly, in the embodiment of this invention as shown in FIGS. 6-20 means as 51 and 61 are provided for continuously directing large shaped volumes of high velocity and high temperature gases in the form of a curtain to the runway surface, as 71, in front of the landing wheels of an aircraft generally as shown in areas 56 and 66 in FIG. 17. In the embodiment of this invention shown in FIGS. 6-20, an airplane, 40, has horizontally extending wings 41 and 42 with a left inboard jet engine 43 and a left outboard jet engine 133 under the left wing 41 and firmly attached thereto and, under the right wing 42 and firmly attached thereto, an inboard right jet engine 44 like the left inboard jet engine 43 and an outboard right jet engine 134 like the left outboard jet engine 133; left landing wheels 45 are supported under the left wing 41 inboard of the left inboard jet engine 43 and right landing wheels 46 are located inboard of the inboard right jet engine 44 and below the right wing 42, and the landing wheels have conventional brakes therefor operatively connected thereto and nose wheels 49 are located at the front of the fuselage 39 in conventional manner.

Figure 9A:
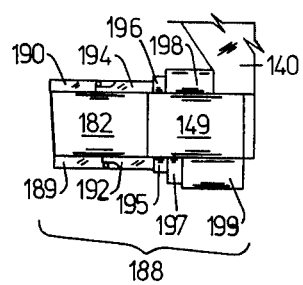
FIG. 9A is a side view looking in a horizontal and outboard direction at the inboard portion of the structures in zone 9C of FIG. 9B when those structural elements are in their flight operative mode, the mode thereof when the airplane is flying as compared to their landing operative mode.
Figure 9B:
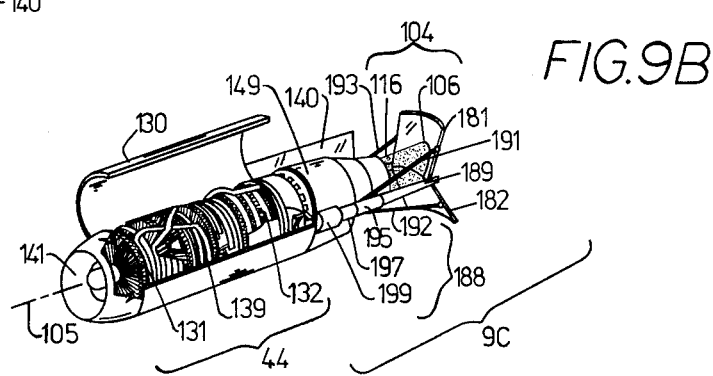
FIG. 9B is a bottom view as shown along arrow 9D of FIG. 7 of an engine 44 and deflector plates 181 and 182 therefor.

The turbojet engine 44 illustrated in some detail in FIG. 9B comprises an air intake 141, compressor blades, 131, a combustion chamber, 139, turbine blades, 132, and the frame 149. The frame 149 is firmly attached by a right inboard engine support 140 to the wing 42 in conventional manner below the wing. The blades 131 and 132 are rotatably supported on the frame 149 to rotate about a common longitudinally extending axis 105 of such engine 44. In operation air enters the intake 141 of the engine and is heated in the combustion chamber 139 and passes the turbine blades 132 and is exhausted as a jet exhaust stream 104. The deflector blades, 81 and 82, are made of a corrosion resistant rigid material and are attached as below described in some detail to the frame 149 as a modified target type thrust reverser by a linkage as shown in FIGS. 9A-B or, alternatively, as in FIGS. 13 to 16B, to create a clearing gas impingement zone as shown in FIGS. 10-12 and 17 and provide a process of operation as illustrated in FIGS. 18-20. Also, a deflector blade assembly as in FIGS. 24-29 which is a modified cascade thrust reverser may be used to create a clearing gas impingement pattern as in FIG. 30 which is functionally similar to the impingement pattern of FIGS. 10-12 and similar to the process of operation shown in FIGS. 17-20.

The inboard left jet engine 43 is operatively connected to a left inboard jet engine exhaust gas stream deflector assembly, hereinafter referred to as the left deflector assembly 51, and the right inboard jet engine 44 is operatively connected to an inboard right jet engine exhaust gas stream deflector assembly 61, hereinafter referred to as the right deflector assembly 61.

Assemblies 61 and 51 are mirror images of each other. Accordingly, the functional and structural description given for one (61) applies also to the like parts in the other (51).

In the overall process according to this invention, an overall process is provided wherein the order of steps effected by a landing aircraft, as 40, on a wet runway surface, 71, is:

(a) during approach to landing while the jet engines 43, 44, 133 and 134 are still on, the power thereof is reduced and the wing flaps, as 138, placed in their maximum drag position as shown in FIG. 1;

(b) with the flaps in such "down" position, the aircraft 40 is brought into "touchdown position," i.e., with its wheels, shown diagrammatically as 45, 46 and 49, with the jet engine still on and the flaps down as in FIG. 2;

(c) following such operation as shown in FIG. 2, with the aircraft 40 at its landing speed and its thrust reverser mechanism actuated as shown in FIG. 3, the aircraft speed is substantially slowed;

(d) thereafter, as shown in FIGS. 4, 6-12 and 16-20 (and 21-30 for another embodiment of the invention) the deflector assemblies, as 51 and 61, on airplane 40 (and assemblies 251 and 261 on airplane 240 of FIGS. 21-30) are then activated whereby successive increments of the runway surface in front of the landing wheels of the aircraft are successively cleared of possibly interfering amounts of water, light snow and the like as diagrammatically shown in FIGS. 18-20 for the aircraft 40 and 240;

(e) following such initial clearing and concurrent with continued operation of the deflector assemblies 51 and 61 (or 251 and 261) the airplane brakes are applied to the landing wheels of the landing gear and the airplane, as 40 or 240, is brought quickly and controllably to a stop as shown in FIG. 5.

The right jet exhaust deflector assembly 61 is firmly supported on the frame 149 of the right jet inboard engine 44 and comprises an inboard deflector plate 81 and an outboard deflector plate 82, an outboard plate axle 84 and an inboard plate axle 83 and an upper plate jack assembly 87 and a lower plate jack assembly 88. The jack assemblies 87 and 88 provide a mechanism for positioning the top edge of outboard plate 82 to have a rearwardly and outboard or laterally extending direction and to bring the inboard plate 81 to a rearwardly and inwardly or inboard extending direction and, also, to position the lower edges of plates 81 and 82 to be located behind the upper edge of such plates 81 and 82, respectively, as shown in FIGS. 16A and 17.

Figure 13:
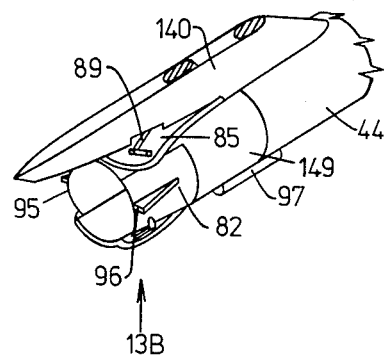

The axles 83 and 84 are rigid and generally extend vertically and are rotatably and firmly mounted and located between a rigid top axle support plate 85 and a rigid bottom axle support plate 86. The axles 83 and 84 are firmly fixed to the right deflector plate 81 and the left deflector plate 82. Plates 81 and 82 are rigid and formed of high temperature resistant alloy and concave inward as shown in FIG. 13.

The plates 85 and 86 are rigid and firmly supported on and attached to frame 149 of the jet engine 44. The top ends of each of axles 83 and 84 are supported in ball joints; each of such ball joints is connected to the rear end of top axle control link train assembly 89. The front end of such link train assembly 89 is firmly attached to the rear end of a movable piston 91: Piston 91 is movable within the top piston cylinder 90 and the piston cylinder 90 is firmly attached to the jet engine frame as shown in FIG. 16A. Elements 89, 90 and 91 form the upper jack assembly 87.

A lower linkage train 99, a movable piston 98 and piston cylinder 97 form the lower jack assembly 88. The bottom ends of the axles 83 and 84 are movably held in guide slots 93 and 94 in the rigid plate 86. The linkage train 99 connects the bottom ends of axles 83 and 84 to the movable rear end of the piston 98 of the piston jack assembly 88. The piston cylinder 97 is firmly attached to the lower plate 86 and, therethrough and thereby to the engine frame 149. A cowling 148 on the skin of the pod 146 for the engine 44 may cover the lower jack assembly 88.

The upper jack assembly 87 is located within the outline of the skin of the motor support 140, as shown in FIG. 16A.

The rigid pivotally extended links of the upper linkage 89 extend from the piston 91 of jack assembly 87 to the top of left axles 83 and 84.

In operation, the upper control linkage 89 serves to rotate the plates 81 and 82; such linkage 89 is operatively connected to the rear of piston rod 91 and is actuated by rigid top piston rod 91. The top piston rod 91 moves in and out of a top piston cylinder 90 which cylinder is firmly fixed to the plate 85 which in turn is firmly fixed to the frame 149 of the engine 44.

Figure 14A:
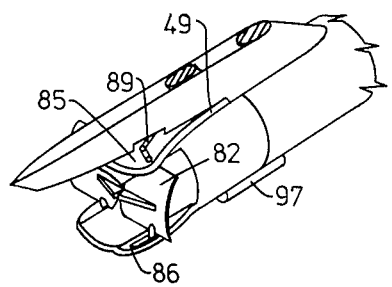
FIGS. 14A and FIG. 14B shows the deflector plates opened.
Figure 14B:
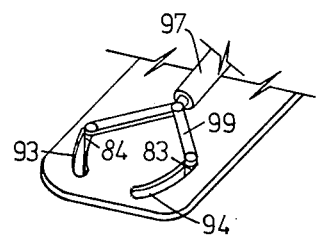
Figure 15A:
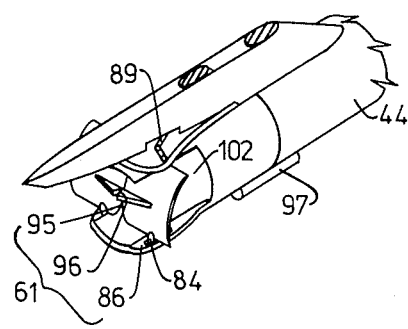
FIGS. 15A and 15B show those plates tilted for downward blast stream extension.
Figure 15B:
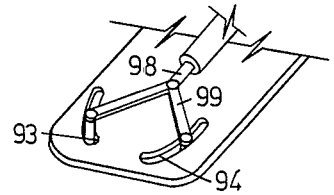

The linkage 89 actuates the axles and the axles 83 and 84 actuate the plates 81 and 82 to move those plates 81 and 82 from a jet engine ejector forming position as shown in FIG. 13 to a transverse blocking mode as shown in FIG. 14A much as in a conventional target type thrust reverser. However, in the assemblies 61 and 51, the lower piston jack assembly 88 moves the bottom ends of the axles 83 and 84, and hence the plates 81 and 82, so that the plates 81 and 82 are moved from the position shown in FIG. 14A to a downwardly and forwardly directed mode of such plates as in FIG. 15A. Then the jack assembly 88 on actuation further moves the bottom ends of the axles 83 and 84 rearwardly as shown in FIG. 15A within the rearwardly and axially (relative to axis 105 of engine 44) directed guide slots 93 and 94 in the lower support plate 86. This movement brings the lower ends of the axles 83 and 84 closer together and, thereby, the front surface of the deflector or target plate 82 assumes, relative to the longitudinal axis 105 of the motor 44, a radially outwardly or outboard facing direction and the front surface of plate 81 assumes an inboard or inward direction and the front surface of each of plates 81 and 82 assume a downwardly slanted attitude relative to the axis 105 of the motor 44 as shown in FIGS. 10, 11, 16A and 17.

In such position of plates 81 and 82 as shown in FIG. 17 there is an angle 102 to the vertical—vertical being shown as line 103 in FIG. 17. The central longitudinal axis 105 of the jet engine 44 is shown in FIGs. 9B, 11 and 17 and is horizontal. In the position of parts shown in FIGS. 16A & 17 a dihedral angle 107, less than 180 degrees, is formed between the rear of plates 81 and 82. Plates 81 and 82 each have rear edges 95 and 96 (rear is to the left as shown in FIGS. 18-20 as well as in FIGS. 1-6 and 13-16B; the rear is upward as shown in FIG. 11 and rear is to the right as shown in FIG. 17). Edges 95 and 96 are not perpendicular to the longitudinal axis 105 of the motor 44 and also are not parallel to the axles 83 and 84 in the closed position of the plates 81 and 82 as shown in FIG. 13. Because of such shaping of the rear edge of the plates 81 and 82 (in the position thereof shown in FIG. 13) in the position of plates 81 and 82 shown in FIGS. 16 and 17, (which position is that which exists in the operation shown in FIGS. 6, 7, 9, 10, 11, 16 and 17 and is used to provide the effect shown in FIGS. 18, 19 and 20) one portion 97 of the jet engine exhaust gas, as 104, is directed, as shown in FIGS. 7, 8, 10, 11 and 17, downward and forward and inboard from the inboard plate 81 and another, outboard portion, 98, of the jet engine exhaust 104 is directed downward and forward and outboard from the outboard plate 82 as shown in FIGS. 7, 8, 10, 11 and 17. Initially, the motion and structure of the plates 81 and 82 is as in conventional target type thrust reversers in the positions shown in FIGS. 13 and 14A, but in the apparatus 51 and 61 and the process according to this invention the deflector plates 81 and 82 are moved further backward than in FIG. 14 to form a dihedral angle as 107 between the back of such plates, which angle is less than 180 degrees and the deflector plates 81 and 82 are also slanted rearward and backward at an overall angle to the vertical, (as 102, in FIG. 17) at the vertical center plane of the jet engine, in which plane the central longitudinal axis 105 of the jet engine 44 lies.

The longitudinal axis 105 of the engine 44 is the axis of rotation of the compressor blades 131 and the turbine blades 132 of the conventional turbine type engine 44; one portion of the cowling or casing 130 of engine 44 is shown open in FIG. 9B.

The stream of hot exhaust gas, 104, from the right jet engine 44 has, as diagrammatically shown in FIGS. 10 and 17, a circular vertical cross-section as measured transverse to the longitudinal axis 105 of the engine 44.

The left deflector assembly 51 has a central, internal or outboard thrust reverser blade and a lateral or outboard thrust reverser blade 53 corresponding in structure and operation to the inboard blade 81 and the outboard blade 82 of the right deflector assembly 61, respectively.

The left hand or inboard half 106 of the stream 104 impinges upon the inboard downwardly and inwardly sloped left clamshell shaped plate 81 of the thrust reverser assembly 61 while the outboard or right half 109 portion of the stream 104 (shown in FIGS. 10 and 11) strikes the right or outboard clamshell shaped plate 82.

The inboard portion 106 of the stream 104 is reflected and/or bounced off from the forwardly and downwardly and inboard facing surface of the clamshell or plate 81 and directed thereby toward and projected against the horizontal runway surface 71 at an impingement zone 66 which is spaced away from and forward of the right front wheel 46 as shown in FIGS. 8, 11 and 17.

The inboard half of exhaust gas stream 104 produced by the right jet engine 44 (which is close to the right landing wheel 46) is thereby formed by the deflector assembly 61 into a right clearing gas stream 97 which is directed forward and inboard and down toward the runway surface 71 to an impingement zone 66 located in front of the landing wheel 46 and extends laterally and centrally of such wheel. The single wheels 46 and 45 are shown in FIGS. 10, 11 and 17 as representative of all the right and left landing wheels 46 and 45 shown in FIGS. 6, 7 and 8.

The successive upward incremental portions of the inboard half 106 of the exhaust stream 104 adjacent to its central edge and vertical diameter along the vertical line extending from the lower point 110 to the upper point 111 (shown in FIG. 10) respectively, are projected on surface 71 in a line extending from a rear and lateral point 112 to a forward and more central point 113 to form a forward or front edge 114 of a semi elliptical zone of gas impingement 66. The vertical circular edge 116 (shown in FIGS. 9B, 10 and 11) of the gas inboard stream portion 106 which impinges on the clamshell 81 is turned and directed toward and projected upon surface 71 in the form of a curved outline or edge of a semi-ellipse, which semi-elliptical zone has (a) a minor diameter 116 which is larger than the length of the radius of the vertical semi-circular gas stream section 104 and (b) a major diameter 114. Diameter 114 of the elliptical pattern zone 66 is much larger than the diameter of the cylindrical gas stream 104—as the gas expands after leaving the exhaust orifice of the engine 44.

The outboard half of exhaust gas stream 104 produced by the jet engine 44 is similarly formed by plate 82 into an outboard gas stream 98 which is directed forward outboard and down toward the runway surface 71 to an impingement zone 166. This impingement zone 166 is, in a multi-engine plane such as in FIGS. 6–8 located so as to avoid re-entry of such exhaust gases into the inlet of the outboard righthand engine 134.

The inboard half of the exhaust gas stream from the left jet engine 43 (which is close to the left wheel 45) is similarly formed into a right or inboard clearing gas stream 197 which is directed forward inboard and down toward the surface 71 to an impingement zone 56 which extends forward of and centrally of and outboard of the left landing wheel 45.

Similarly, the outboard half of the exhaust gas stream produced by the left jet engine 43 is formed into an outboard gas stream 198 which is directed forward, outboard and down toward the surface 71 to form an impingement zone 156, which is the mirror image of zone 56 and 166.

The lateral reaction of the stream 97 against the assembly 61 is balanced by the inboard thrust or reaction of the gas stream 98. Similarly, the lateral reaction of the stream 197 is balanced by the inboard reaction of the stream 98 on the assembly 51.

Each impingement zone, as 66 and 56 and 156 and 166 is properly and accurately described as lying on the generally horizontal runway surface 71 because in such zones (56, 66, 156 and 166) whereat the clearing gas stream, as 97, 197, 98 and 198 meets the surface 71, if there were theretofore a layer of water, as 72 or 75, on such surface, as 71, a dry increment of surface, as 79, as shown in FIGS. 18, 19 and 20, is developed thereon as such water layer portions as 72 and 75 are blown away therefrom.

More particularly, the water layer 72 to the rear of the impingement zone 66 has a top surface 73. The action of the streams 97 and 98 and motion of the airplane 40 leaves a rear water edge 74 at the rear end of the dried increment 79 of the surface 71. The water layer 75 in front of the dried increment surface has a top horizontal surface 76. The gas stream from the plate 81 acts somewhat as a plow set at an angle 50 from the line of travel 46 (shown in FIG. 11) and drives the water contacted thereby forward and laterally, while the rear edge 117 drives the mass of water 72 contacted thereby rearwardly in direction of line 124, substantially parallel with the inside surface of the wheel 46 and assists the action shown in FIGS. 18–20.

Generally, each of the clearing gas streams 97, like streams 98, 197 and 198 is in the like shape of a portion of a cone with its apex to the rear of the plate (as 81, 82, 52, 53, respectively) from which such stream is directed (or reflected) to the surface 71. The stream 97 meets the runway surface 71 at an inboard right initial impingement zone, 66, which is generally a portion of, i.e., a half of an ellipse or conic section. The three dimensional aspects of the conical surface shape is shown more pictorially for the left side clearing streams, 197 and 198, in FIG. 17 than for the corresponding right clearing streams, 97 and 98, but the outline of such gas streams of like size and shape are shown in FIGS. 7, 8, 10, 11, 12 and 17. The apex of the corresponding cone related to such conical shape is slightly in back of the inboard or central blade 81 of the thrust reverser assembly 61, and, for the mass 197 slightly in back of the inboard or central blade 52 of the thrust reverser assembly 51. The initial impingement zone as 66 for stream 97, shown stippled in FIGS. 11 and 17 is wider in its central portion (near point 113) and narrows laterally at a point 112 and extends forwardly and centrally along line 114 in the surface 71.

In the surface 71 the front edge 114 of the impingement zone 66 intersects the line of travel 48 of the right wheel, 46, at an acute angle, 50, while the rear edge 117 of the impingement zone 66 on the surface 71 intersects the line of travel of the right wheel 46 at an angle 119 which is 90 degrees or greater; i.e., an obtuse angle, and helps prevent accumulation of water inboard of the wheel 46.

The same water displacing or flow action occurs on the left side impingement area 56 as on the right side impingement area 66 with water on surface 71 at the front edge of zone 56 being thrown leftwards in the direction 123 as above described for the water flow direction 122.

Additionally, while the above description of the exhaust gas stream 97, 98, 197 and 198 refers to the zone of initial impingement, the volumes of gas directed toward the surface 71 from blades 51 and 82 form a central front zone 121 shown in FIGS. 10 and 11 occupied by a zone of compressed air which forms a forwardly directed pointed edge 121 and a rearwardly directed pointed edge 128 so that the overall sectional view and area of impingement when one considers the secondary zone of impingement by the air resulting from the reaction of streams 97 from the right side of the airplane and 197 from the left is somewhat in the shape of a section of a tractrix with pointed portions 121 and 128. Accordingly, while the forwardly and centrally directed front edge of zones 66 and 56 act like a scraper blade to remove water from the surface of the ground in front of the wheels or wheel assemblies 45 and 46, the central front zone 121 acts like the apex of a V-shaped plow blade to throw water laterally whereby water is removed from the front of the wheels at a point spaced away from those wheels as shown in FIGS. 18, 19 and 20 with the streams of gas 97 and 197 acting like a very rapidly moving (120 to 180 m.p.h.) broom directed in the forward direction.

Each of the streams of extremely hot gas, as 97 and 197, does not affect the adjacent tires, as 46 and 45, respectively, because the zones of impingement, 56 and 66, are on the pavement or surface 71 in front of the tire rather than against the tire, as shown in FIGS. 11, 18, 19 and 20. In the arrangement of the impingement areas according to this invention, the zones of impingement, 56 and 66 of the hot exhaust gases obtained from the jet engines 43 and 44 used to remove water from the runway surface during landing operations provide that the front edges of the zones of impingement are at an acute angle (as 50) to the path of travel of the aircraft (as shown by its wheels path 47 and 48) on landing, while the rear edges of the zones of impingement, as edges 117 and 217, are at a right angle or an obtuse angle to such paths, as 47 and 48. The front edges, as 114 and 214 of each of the zones, as 66 and 56, of the hot gases removes water sideways away from each of such zones, as 66 and 56, and the rapidity of motion of such edges and the lateral extent of such zones, as 56 and 66, provides a broom-like action that sweeps the water away so rapidly that the water returning slowly from the lateral edges of such zones to the rear of zones 56 and 66, as along the lines 135, (which extends centrally and rearwardly from the right outboard limit, 112, of the zone of impingement 56) and the line 138 which extends from the left outboard edge, 212, of the left zone of impingement 66) does not resurface (with water) the area in the zone, as 79, for a sufficiently substantial period of time following the initial creation of such zones of impingement, as shown in FIG. 11, that wheels or wheel assemblies, as 46 (and 45) will be in direct contact with the dry landing strip surface 71 and brakes may be effectively applied without skidding, as shown in FIGS. 18-20.

For illustrative purpose diagrammatic FIGS. 18, 19 and 20 are drawn with the same location indicia—141, 142, 143, 144—shown on the surface 71, and are drawn to the same scale.

During the first stage of operation where each stream, as 97, first contacts an impingement area as 66, as shown in FIG. 18, water is blown away from (in zone 79) between the points 141 and 143. During that initial period of time of activation of assemblies 51 and 61 of about 1/40 of a second (4 to 6 feet÷270 feet/second) as shown in FIG. 18, the wheels, as 46, temporarily rest on the upper surface 72 of a body of water 73 rearward (left as shown in FIG. 18) of point 141 on surface 71.

During the following or next, second, period, the stream as 97 and zone 66 are still the same distance in front of its wheel assembly as 46, and the wheel assembly 46 and stream 97 and zone 66 move forward (rightwards as shown in FIG. 19). Due to such movement of stream 97 in that second step, additional water is displaced from the points 142 to 144 by stream 97 as shown in FIG. 19.

Figure 22:
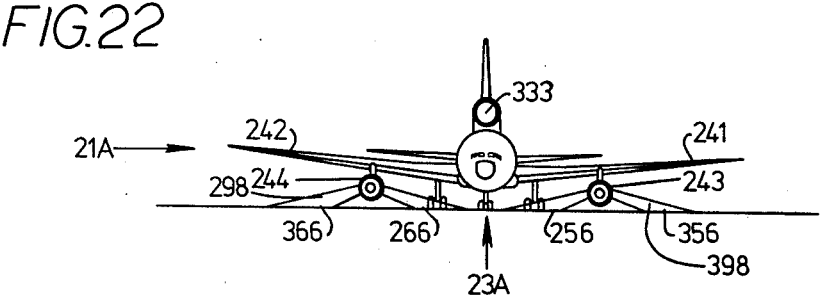
FIG. 22 is an overall front scale view along direction 22A of FIGS. 21 and 23 to show the position of two clearing gas streams as observed in the vertical plane from the front of the aircraft.

However, in the first step the water is blown away sufficiently laterally far away (as to points 112 and 212) from the wheels 46 and 45, and the front edges, 114 and 214, of zones 66 and 65 are moving forward so quickly (like a broom over a rainy porch) that the water which was located at or driven beyond the ends 112 and 212 of impingement zone edges 114 and 214 and which latter flows centrally toward the lines 48 and 47 does not intersect or reach the line of travel of the wheel, as lines 48 and 47, until after the wheels, as 46 and 45, have moved forward to a point in front of the line of the water edge, as 141 in FIG. 19; thereby the zones of contact of the wheel 46 on the ground 71, as at points 150 and 151 and thereafter are zones of direct contact between the tire surface and the dry runway, as shown also in FIGS. 11 and 17 (and in FIGS. 22 and 30 for embodiment 240). Such contact is effected by the process and apparatus described herein because, in the position of wheels and water as shown in FIG. 20, wheels directly contact, as at 151, an increment of the runway surface, as between points 142 and 143 from which zone water theretofore covering such first increment of surface had been removed by the stream 97 which stream forms a curtain that displaced and drove away laterally and forwardly the liquid water before it.

Accordingly, after initial application of the gas clearing stream or curtain 97 as shown in FIG. 18 to an increment of surface 71 such as the first increment extending from point 141 through and across point 142 to the front edge 114 of pattern 66 at point 143 and displacement of water from that first increment with consequent lateral movement of such water by such stream, 97, the rear portion of that first surface increment between surface points, as 141 and 142, is not recovered by water until a later time as shown in FIG. 20, when the water layer 72 reforms in back of the wheel 46 with a distance, as 147, between the area of contact, 151 of such wheel 46 on dry surface and the advancing rear edge, as 74, of the water mass 72: that mass of water comes into the position shown therefor in FIGS. 11 and 20 from the water layer outboard of the wheels 46 and 45 (not forwardly from the rear of the airplane) because each such wheel, as 46, is moving at usually over 100 miles an hour at initial activation of assemblies 51 abd 61 and the water displaced by streams 97 and 98 moves in from the positions, as 112 and 212, outboard of the wheel lines 47 and 48 at a much slower rate of speed.

Figure 23:
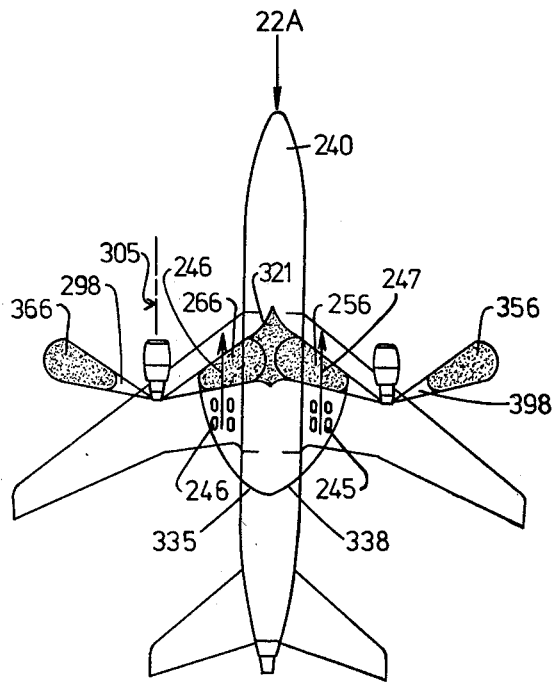
FIG. 23 is a bottom view taken in the direction of the arrow 23A of FIG. 22.

Assemblies 51 and 61 of embodiment 40 and assemblies 251 and 261 of embodiment 240 provide that the inboard impingement zones, as 66, 65, 266 and 265, are of such size and shape and location that the amount of lateral displacement of the water layer 72 on surface 71 displaced by such clearing gas streams, as 97, 197, 297 and 397 is so great that the time required for the thereby displaced water to return from such laterally displaced locations as 112, 212, 312 and 313 to the lines of travel of the wheels adjacent to the lateral edge of the impingement zones is insufficient for water at such locations, such as the water initially there and also displaced water, to reach such lines of travel until after the adjacent landing wheels, as 46, is forward of the point of intersection of (a) the inner edge of the inwardly moving water, as edges 135 and 138 in FIGS. 11 and 17, and edges 335 and 338 in FIGS. 23 and 30, and (b) the lines of wheel travel 48 and 47 in embodiment 40 and lines 248 and 247 in embodiment 240.

Continued rapid movement of the airplane wheels, as 46, in directions parallel to lines 47 and 48, followed at a distance by the water, reaches an equilibrium situation generally as shown in FIGS. 11, 17 and 30 in which the edges of the water are defined by a pattern formed by the edges 114, 121, 214, 138 and 135 (in FIGS. 11 and 17) and within which pattern the wheels, as 45 and 46 meet a substantially dry runway surface until the speed of the plane 40 is so reduced that hydroplaning and skidding danger is substantially absent. The volume of each air curtain, as 97, per lineal foot in front of the wheels traversed by the wheels per unit of time increases at a given throttle setting of the engine as the speed of the plane decreases so that the efficiency of the clearing action increases somewhat as the plane speed decreases at a given throttle setting. Any amount of water remaining on the surface 71 after passage of the streams 97 and 98 thereover is so negligible as to be automatically accommodated within the usual spaces between the tire treads. Also, each gas stream, as 97, applied to the impingement zone is sufficiently hot that the surface tensions of any water remaining on the runway surface is so reduced that the characteristics of that remaining water which usually might support a hydroplaning action by virtue of its surface tension is substantially reduced.

The temperature of the runway surface ground does not rise above 212° F. because of the limited time of gas-liquid contact and the space between each clearing stream, as 97, and the neighboring landing wheel, as 46, avoids high temperatures at the tire's surface as might result by direct contact of the wheel tires with a clearing gas stream. Contact of the wheels, as 46, with the warmed and dried ground does remove water that might have been on such wheel prior to its landing during its motion toward the runway surface. Such warming, for instance, is diagrammatically shown in FIG. 19 as temperature gradient line 70, the height of which shows 40° F. to 212° F. ground temperature. The tire shown in FIG. 20 is a dry tire, contacting a substantially dry landing surface by the process above described. The gas clearing stream 97 also is sufficiently hot that any evaporative cooling effect by the removal of water from surface 71 is ineffective to cause condensation thereon.

The structure and action above described provides for keeping the inboard or central edge, as 113, of the forward edge of initial line of contact 114 of one impingement zone, as 66, on one side of the airplane 40 sufficiently close to the inboard or central edge, as 213 of the forward edge of initial line of contact 214 of left impingement zone, as 56, on the other side of the airplane 40 to cooperatively create therewith a front forwardly pointed V-shaped point portion 121 of the overall gas curtain: such overall V-shape is shown in FIGS. 11 and 17 as resulting from the pattern outlined by points 112, 113, 121, 213 and 212. Such gas curtain extends in front of and outboard of each pair of landing wheels, as 45 and 46, with the rear edge of each of such zones of initial impingement, as 56 and 66, on the ground 71 spaced away from each landing wheel, as 46 and 45, as shown in FIGS. 6, 8, 11, 17–20, 21, 23 and 30.

According to this invention, therefore, a gas curtain is provided which is (a) firstly, long enough to extend laterally from a point outboard of the wheels, as 112, to the center of the airplane 40; i.e., to a line 120 halfway between the lines of travel 48 and 47 of the wheels 46 and 45; (b) secondly, the area or zone of each impingement zone as 66 is sufficiently thin near the center line 120 that the air flow from the engines, as 44 and 43, on opposite sides of the airplane, to neighboring adjacent points of the edges of the initial impingement zones, edges 117 and 217 to not so vigorously or directly oppose each other as to not create a front pointed zone, as 121: thereby, because of such absence of opposition, a "V" shape as in FIG. 17 is formed; (c) thirdly, there is a space between points as 150 and 142 in FIG. 19 and points 151 and 147 in FIG. 20 between the back edge of each impingement zone, as at line 117 of zone 66, and the front of the wheel 46 adjacent to such impingement zone whereby the heat of the exhaust gas stream or blast, as 97, does not strike or affect the tire of the wheel 46; (d) fourthly, each impingement zone pattern must be adequately thick; i.e., the impingement pattern must be sufficiently thick or wide along the zone or portion thereof lying in the direction of the line of wheel travel, as line 48 for wheel 46 and line 47 for wheel 45 as shown in FIGS. 17, 18 to 20 and lines 247 and 248 for wheels 245 and 246 as shown in FIGS. 23 and 30, that an effective curtain is provided which disperses the water on the runway in front of the V-shaped edge (112-113-121-213-212 or 312-313-321-413-412).

Thereby the edges of the water volume separated by the edges 135 and 138 (and 335 and 338 in FIG. 30) at the sides of the swept out zone to the rear of the impingement zones, as 55 and 56 in FIG. 17 (and 255 and 256 in FIG. 30), move inwards toward the lines of travel, as 48 and 47 in FIGS. 11 and 17 (and 248 and 247 in FIG. 17) at a sufficiently slow rate relative to the speed at which the wheels (as 45 and 46) are moving forward (in the directions, as 48 and 47) that the wheels (as 45 and 46) continuously contact dry ground after the initial stage thereof as shown in FIG. 18.

For different size aircraft and location of engines or different aircraft the same functional relationships are kept by so positioning the deflector plates, as 81 and 82 (and 281–286) to keep the lateral edge, as 112 (and 312) of each of the lines of contact, as 114 (and 314) of each impingement zone, as 56 (and 256) sufficiently outboard of the wheel, as 46 (and 246) neighboring the motor, as 44 (and 244) from which the clearing gas stream, as 97 (and 297) comes to provide for such action as above described for motors 44 and 43 (and 244 and 243).

Accordingly, the length of the impingement pattern as along line 114 between points 112 to 113 and along the line 214 from point 212 to 213 is sufficiently long enough and thin enough to form a V-shaped pattern which V-shaped pattern edge extends across the front of the wheels 46 and 45 and also extends outboard of both of them, so that the pattern of the edges of the water 135 and 138 to the rear thereof, in view of the speed of the airplane 40, provides an area 79 therebetween within which the wheels, as 46 and 45, contact dry ground as shown in FIGS. 18, 19 and 20 notwithstanding the earlier presence of a layer of water 72 thereover.

The jack or plate positioning assembly, 188, in FIGS. 9A and 9B comprises a bottom longitudinal center jack arm 189, a top center longitudinal jack arm 190, and link assembly parts 191–194 and piston parts 195–199.

The bottom arm 189 is a rigid longitudinally extending arm adjustably fixed at its front end to the bottom piston cylinder body 197: body 197 is movably held in a piston cylinder 199 and piston cylinder 199 is firmly attached to the engine frame 149 along the vertical plane which includes the center line or axis 105 of engine 44. At its rear end arm 189 is pivotally yet firmly attached as shown in FIG. 9B to the lower edge (rear lower edge in FIG. 9B) of deflector plates, as 181 and 182. Plates 181 and 182 are mirror images of each other and semicylindrically shaped internally rigid plates able to withstand the temperatures of the jet exhaust and maintain their dimensional stability (like plates 81 and 82 in FIGS. 13–16B).

A rigid top longitudinally extending center jack arm 190 similar in structure to arm 189 is firmly attached at its front end to the top of the engine frame 149 along the plane of its center line and is pivotally attached at its rear end to the upper edge at its rear (as in FIG. 9A) of each of plates 181 and 182.

Each member of a pair of rigid longitudinally movable lower links 191 and 192 is pivotally attached at their rear ends to the lower edges of plates 181 and 182 forward of their rear ends, respectively, and each of such links is pivotally attached at its front end to the rear end of a rigid movable jack piston arm 195. Piston arm 195 is movably located in the piston body 197 which body 197 is a piston cylinder. Cylinder 197 is movably located in the piston cylinder 199 for movement longitudinally thereof and is firmly attached to the frame 149 along the vertical plane of its center line.

Each member of a like pair of rigid longitudinally extending upper links, 193 and 194, is pivotally attached at its rear end (as shown in FIGS. 9A and 9B) to the upper edge of a plate 181 or 182, respectively, and each such link is pivotally attached at its front end to the rear end of a movable top piston arm 196; arm 196 is movable along the length of a top piston cylinder 198 which cylinder is firmly attached to the frame 149 along the vertical longitudinal plane including center line or axis 105.

The links 191 and 192, 193 and 194 are moved by the pilot of the airplane when operation as in FIG. 3 is desired from their flight operative mode backwards to their rearward expanded thrust reverser position by actuation of the piston arms 195 and 196 to move those piston arms backwards and thereby move the plates 181 and 182 to a laterally extending forward and horizontally facing position as shown for plates 81 and 82 in FIG. 14A—and likewise controlled—for thrust reversing action.

Thereafter, in and for the stage of operation shown in FIG. 4 the piston body 197 is moved further backward to move lower links 191 and 192 further backward as shown in FIG, 9B whereby the deflector plates 181 and 182 are both positioned to face downward and forward relative to the axis 105 of the engine 44 and plate 181 is also slanted to face substantially inboard and plate 182 is also slanted to face correspondingly substantially outboard to provide positions of plates 181 and 182 relative to axis 105 as above described and shown for the deflector plates 81 and 82 in FIGS. 16A and 17 and to create impingement zones, as 66 and 166, respectively, and effect corresponding water clearing action.

The structure of plate positioning assembly 188 of FIGS. 9A and 9B as well as the corresponding jack assemblies in assemblies 61 and 51 and 161 and 151 thus provide for (a) conventional thrust reverser action as well as (b) the creation of the impingement zone patterns as shown in FIGS. 17 and 30 and provide for the water clearing operation described therefor.

In their operative mode piston arms 195 and 196 and cylinders 197 and 198 therefor and 199 are covered by cowling as 148 attached to the engine cover 146 and those pistons are operatively connected to conventional power source and controls therefor in the fuselage 39 available to the pilot and similar power and control structures are provided for the pistons of the deflector plate assemblies 51 and 61 shown in FIGS. 10–16B and for power means attached to the deflector plate assemblies 251 and 261 and shown in FIGS. 24–29.

In the embodiment of this invention as shown in FIGS. 21–30 means as 251 and 261 for continuously directing large shaped volumes of high velocity and high temperature gases in the form of a curtain to the area of the landing surface, as 71, in front of the landing wheels of an aircraft 240 generally as shown in areas 265 and 266 in FIGS. 21–23 and 30 are provided for an airplane 240. According to the embodiment of this invention shown in FIG. 27, an airplane 240, has horizontally extending wings 241 and 242 with a left inboard jet engine 243 supported by and under the left wing 241 and, under the right wing 242, a right engine 244 like the left jet engine 243 and a rear engine 333. Left landing wheels 245 are supported under the left wing 241 inboard of the left inboard engine 243 and a right landing wheels 246 are located inboard of the inboard right engine 244 and below the right wing 424 and the landing wheels have conventional brakes therefor operatively connected thereto and nose wheel 249 is located at the front of the fuselage 39 in conventional manner. The left wheels 245 travel in a straight line 247 parallel to the length of the fuselage 240 and the right wheels 246 have a straight line of travel 248 parallel to the length of the fuselage. Both of these lines of travel lie in surface 71 and intersect, as shown in FIGS. 23 and 30 the zone of impingement of the hot gases provided by apparatuses 251 and 261 and engines 243 and 244.

Figure 21:
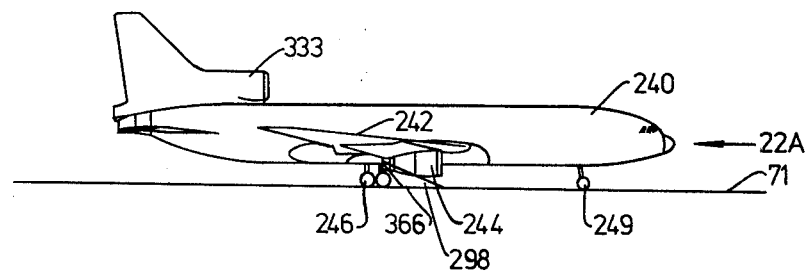
FIG. 21 is a scale side view of an airplane equipped according to another embodiment of this invention as seen along the direction of arrow 21A of FIG. 22 to show position of an outboard gas stream 298 as seen in the vertical plane.

The drawing of FIGS. 21, 22 and 23 are made to scale and to the same scale to show the relations of the positions of the apparatus herein described on such airplane and Table II sets out the particular dimensions thereof.

Each turbojet engine, 244 and 243, like 44, comprises an air intake, compressor blades, a combustion chamber, turbine blades, and a frame and its frame is firmly attached by an engine support as 340 to a wing as 242 in conventional manner below that wing. The turbine blades are rotatably supported on the engine frame to rotate about a common longitudinally extending axis, as 305 of engine 244. In flying operation, as in engine 44, air enters the intake as 441 of the engine and is heated in the combustion chamber and passes the turbine blades and is exhausted as a jet exhaust stream as 304. Deflector blades 281-286 are made of a corrosion resistant rigid material and are attached (as below described in some detail) to the frame as a modified cascade thrust reverser deflector blade assembly to create a gas impingement pattern as in FIGS. 20–23 and 30 which is functionally similar to the impingement pattern of FIGS. 7, 8, 10 and 11 and function as above described for the process of operation described for and shown in FIGS. 17–20.

The left jet engine 243 is operatively connected to a left inboard jet engine exhaust gas stream deflector assembly hereinafter referred to as a left deflector assembly 251 and the inboard right jet engine 244 is operatively connected to an inboard right jet engine exhaust gas stream deflector assembly hereinafter referred to as the right deflector assembly 261.

Assemblies 261 and 251 are mirror images of each other. Accordingly, the functional and structural description given for one (261) applies also to the like parts in the other.

In the overall process according to this invention, an overall process is provided wherein the order of steps effected by a landing aircraft, as 240, on a wet runway surface, 71, is: (a) during approach to landing while the jet engines 243, 244 and 333 are still on, the power thereof is reduced and the wing flaps placed in their maximum drag position as shown in FIG. 1; (b) with the flaps in such "down" position, the aircraft 240 is brought into "touchdown position," i.e., with its wheels or wheel assemblies as 245, 246 and 249 in contact with the ground and any water layer thereover, with the jet engines still on and the flaps down as in FIG. 2 for the aircraft 40; (c) following such operation as shown in FIG. 2, with aircraft 240 at its landing speed and the thrust reverse mechanisms actuated as shown in FIGS. 3 and 24 and 26 and 27, the aircraft speed is substantially slowed: (d) thereafter, as shown in FIGS. 21-23, 25, 28, 29 and 30, the surface dewatering mechanisms, as 251 and 261, are then activated whereby successive increments of the runway surface in front of the landing wheels of the aircraft are successively cleared of possibly interfering amounts of water, light snow and the like; diagrammatically as shown in FIGS. 18-20 and 30; (e) following such initial clearing and concurrent with continued operation of the clearing assemblies 251 and 261, the airplane brakes are applied to the landing wheels, as 245 and 246 of the landing gear and the airplane, as 240, is brought to a stop as shown in FIG. 5.

Figure 24:
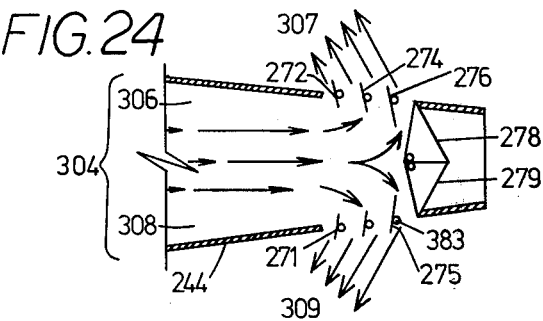
FIG. 24 is a horizontal transverse longitudinal section taken through the sectional plane 24A—24A of FIG. 27.

The engine 244 has conventional cascade type thrust reverser deflector plates 271-276, each of the plates being pivotally supported on axles therefore, as 383 for plate 275, and actuated by a control linkage that turns such axles and operatively connects to a conventional power source therefor. Such axles are vertical and each point on the thrust reverser plates as 275 rotates while in a horizontal plane while engine axis 305 is horizontal. Such deflector plates serve to direct inboard portion 308 and outboard portion 306 of jet exhaust stream 304 as horizontally and forwardly directed reverse thrust streams 309 and 307, respectively, when blocking doors 278 and 279 are positioned as shown in FIG. 24 to effect such thrust reversal. A series of similar lower deflector plates 281-286 are rotatably mounted on the frame of engine 244 at an angle to and below plates 271-276 to direct an inboard forwardly and downwardly directed water clearing gas stream 297 and an outboard downwardly and forwardly directed water clearing gas stream 298, respectively, to an inboard initial gas impingement zone 266 and an outboard initial gas impingement zone 366 on surface 71. The lower deflector plates, 281-286 are rotatably or pivotally supported on axles therefore, as 384 for plate 285, and actuated and operated by a control linkage as 291, like 91 that turns such axles as 384 and operatively connects to a power source therefor as 290 as for plates 271-276. All such axles as 384, are at an angle to the vertical and each point on each of the plates supported thereby, as 285, rotates about an axis of rotation through its axle as 384 while in a plane at an angle to the horizontal. Thereby as in shown to scale in FIGS. 21-23, such deflector plates serve to direct the streams 297 and 298 to the zones 266 and 366, respectively, when the blocking doors 278 and 279 are positioned as shown in FIG. 28.

Figure 26:
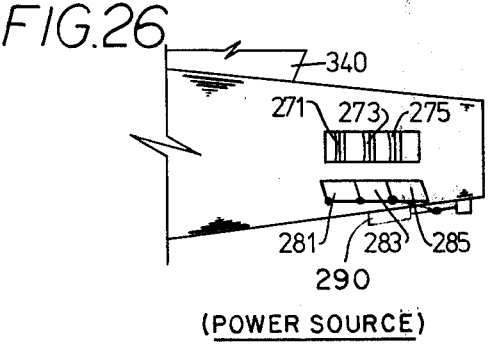
FIG. 26 is a side view taken along the direction of the arrow 26A of FIG. 27. In this mode of operation the jet reverser plates are shown operative and the gas clearing stream deflector plates are shown closed.
Figure 27:
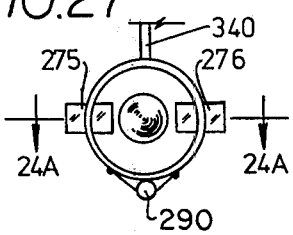
FIG. 27 is a rear view along the direction of the arrow 27A of FIG. 26 showing the thrust reverser plates operative and the gas clearing stream deflector plates closed.
Figure 28:
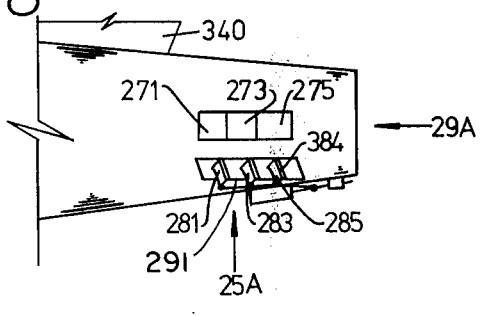
FIG. 28 is a side view along the direction of the arrow 28A of FIG. 29 with the thrust reverser plates closed and the gas clearing stream deflector plates operative.

A conventional power source and linkage and jack assembly actuates the axles and the axles therefor actuate the plates 271-276 to move those plates from a jet engine ejector forming flying mode position as shown in FIG. 28 to a transverse blocking mode as shown in FIGS. 24, 26 and 27 as in a conventional cascade type thrust reverser. However, in the assemblies 261 and 251, an additional lower piston jack and axle assembly is powered and actuated as are plates 271-276 to move lower deflector plates 281-286 so that those lower deflector plates are moved from their closed position shown in FIG. 26 to a downwardly and forwardly directed mode of such plates as in FIGS. 28 and 29 rather than horizontally as in FIGS. 24 and 26. Thereby, as shown in FIGS. 28 and 29 the front surface of the lower deflector plates 281-286 assume, relative to the longitudinal axis 305 of the motor 244, a radially outwardly or outboard direction on the part of plates 282, 284 and 286 and inboard or inwardly facing direction by the plates 281, 283 and 285 as well as a downwardly slanted attitude relative to the horizontal axis 305 of the motor 244.

Figure 25:
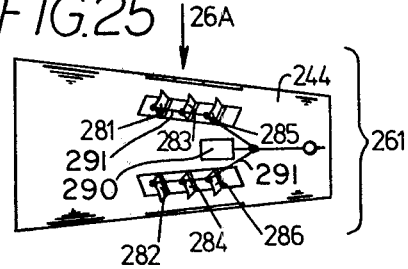
FIG. 25 is a bottom view taken along the direction of the arrow 25A of FIG. 28.
Figure 29:
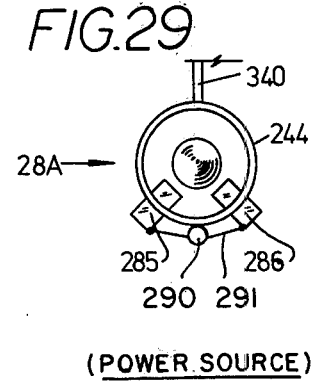
FIG. 29 is a rear end view of the engine 244 in the direction of the arrow 29A of FIG. 28.

The position of FIGS. 25, 28 and 29 is that which exists in the operation shown in FIGS. 21, 22, 23 and 30 and provides the effect shown in FIG. 30 wherein the inboard portion of that jet engine exhaust gas is directed as shown in FIGS. 21, 22, 23 and 30 downward and forward and inboard from the inboard deflector plates 281, 283 and 285 as stream 297 and another outboard portion of the jet engine exhaust is directed downward and forward and outboard from the outboard plates 282, 284 and 286 as shown in FIGS. 22, 23 and 30 as stream 298.

In the same manner as (a) the inboard portion of the exhaust gas stream produced by the right jet engine 244 (which is close to the right landing wheel 246) is formed as above described by the deflector assembly 261 into a right water clearing gas stream 297 which is directed forward and inboard and down toward the runway surface 71 to an impingement zone 266 located in front of the landing wheel 246; (b) the inboard portion of the exhaust gas stream from the left jet engine 243 (which is close to the left wheel 245) is similarly formed into a right or inboard clearing gas stream 397 which is directed forward inboard and down toward the surface 71 to an impingement zone 256 which extends forward of and centrally of and outboard of the left landing wheel 245; and (c) the outboard exhaust gas stream portion 306 produced by the jet engine 244 is also formed into an outboard gas stream 298 which is directed forward outboard down toward the runway surface 71 to an impingement zone 366, and (d) similarly, the outboard portion of the exhaust gas stream produced by the left jet engine 243 is formed into an outboard gas stream 398 which is directed forward outboard and down toward the surface 71 to form an impingement zone 356.

The lateral or outboard reaction of the stream 297 against the assembly 261 is balanced by the inboard or central thrust or reaction of the gas stream 298; similarly, the lateral or outboard reaction of the stream 397 is balanced by the inboard or central reaction of the stream 298 on the assembly 251.

The assemblies 251 and 261 and impingement zones 266 and 265 are mirror images of each other so that the description of structure and operation of the one (261) correspondingly applies to the other (251) as herein described and shown.

The inboard portion 308 of the stream 304 is reflected and/or bounced off from the forwardly and downwardly and inboard facing surface of the plates 281-286 and directed thereby toward and projected against the horizontal runway surface 71 at an impingement zone 266 forward of the right front wheel 246. The successive upward incremental portions of the inboard half 308 of the exhaust stream 304 are projected on surface 71 with a front edge 314 extending from a rear and lateral point 312 to a forward and more central point 313 to form a forward or front edge 314 of an elongated zone of gas impingement 266.

Each area or impingement zone, as 266 and 256 and 356 and 366 is properly and accurately above described as lying on the generally horizontal runway surface 71 because in such zones 256, 266, 356 and 366 whereat the gas streams, as 297, 397, 298 and 398 meet the surface 71, if there were theretofore a layer of water, as 72, on such surface, as 71, a dry increment of surface, as 79, as shown in FIGS. 18, 19 and 20, is developed thereon as the water layer, 71, is blown away as above described.

The initial impingement zone as 266, shown stippled in FIGS. 23 and 30 extends forwardly and centrally in the surface 71. In the surface 71 the front edge 314 of the impingement zone intersects the line of travel 248 of th right wheel, 246, at an acute angle, 250, and throws water laterally to the right during travel of the wheel 246 in direction 248.

The same water displacing or flow action occurs on the left side impingement area 256 as on the right side of impingement area 256 with water on surface 71 at the front edge of zone 256 being thrown leftwards.

Additionally, while the above description of the exhaust gas streams 297, 298, 397 and 398 refers to the zone of initial impingement the volumes of gas directed toward the surface 71 toward airplane center line 320 creates a forwardly pointed zone 321 shown in FIGS. 23 and 30 occupied by a zone of compressed exhaust gas so that the overall area of impingement including the gases resulting from the reaction of streams 297 from the right side of the airplane 240 and 397 from the left thereof is somewhat in the shape of a section of tractrix with a pointed portion 321. Accordingly, the zone of compressed gas in zones 266, 256, and 321 acts like a scraper blade to remove water from the surface of the ground in front of the wheels 245 and 246 while the central front zone 321 acts like a V-shaped plow blade point to move water outboard from surface increments in front of wheels as 46 to points spaced laterally from those wheels (and then rearwardly) as shown in FIGS. 18-20. Because the streams of gas of FIGS. 21-23 and 30 also act as a very rapidly moving broom although in fact a moving curtain of gas as above described for the action in FIGS. 18-20 and such streams preclude resurfacing with water of the area in a large zone, as 279, for a substantial period of time following the initial creation of such zones of impingement as above described and shown in FIGS. 18-20 and such zone as 279 is sufficiently substantial that wheels as 246 and 245 are in direct contact with the dry landing strip surface 71 so the wheel brakes may be effectively applied thereto without skidding.

An important factor in the success of this process is the great quantity and high temperature of the gas involved. In embodiment 240 about 1,365 pounds of air per second may be moved by each engine, as 244, of the airplane, as 240, involved. Inasmuch as 29 pounds of air occupies 359 cubic feet and common exhaust gas temperature is 1,000° F. at least, about 17,000 cubic feet per second are provided in each of the streams, as 297 and 298. At a landing speed of 180 miles per hour (of about 270 feet per second) about 64 cubic feet ($=17\times 10/^3$cu. ft. per. sec.$\div$270 ft. per. sec.) are directed at each foot of landing surface over which path 248 each landing wheel, as 246, passes. The length of the impingement zone area, as 79, or 279, concurrently thereby treated is, as shown in FIGS. 11, 20, 23 and 30 at least about 4 feet wide at the vertical planes corresponding to plane 18A—18A of FIG. 11. Therefore, 256 cubic feet ($=64$ ft. cu. per ft.$\times$4 ft.) are provided as a 4 foot thick gas stream in front of each of the landing wheels, as 245 and 246.

Such a volume readily produces a pattern, as 256, far in excess of 30 feet long from point 312 to 321 and approximately 8 feet wide while 20 feet$\times$4 feet is adequate to mechanically remove the water located in zone 266 in front of the wheels, as 245 and 246, as above described: accordingly a low throttle setting may be used. Other more powerful engines, as the CF6-6 used in the DC-10 airplane produce 1,465 lbs. air/second and produce correspondingly greater air flows to the impingement zones as 56 and 66 using deflector plates as shown in FIGS. 9A, 9B and 16A and 16B.

While the shapes of impingement are as shown in FIGS. 8, 10, 11 and 21-34 for the particular models of airplane referred to other shapes and sizes may be used for other planes. Also, as shown in FIG. 12 the angle of the deflector blade may, within the teachings hereinabove, be changed to maintain the relationships of the lateral edge of the impingement zone and the airplane landing wheels as the airplane speed decreases in order to maintain a dry surface condition on the surface met by the landing wheels. In FIG. 12 the angle or deflector plate 81 to the vertical (as 102) of assembly 61 and for the corresponding plate 52 are greater than in FIG. 11, and the outboard edge of pattern 66 extends further outboard (to left as seen by the reader) and the outboard edge of pattern 56 extends further outboard (to the right as seen by the reader) than in FIG. 11 which is effected by a tilting of the impingement surfaces, as 81 and 52, to create a pattern than meets the ground further outboard than is shown in FIG. 11 although the angle 50 is greater than it was shown in FIG. 11. This greater angle 50 is tolerable with the slower speed of the airplane and is used, with the same volume of streams as 97 and 197 to require a greater time for the water at the outboard edge of the impingement pattern, as 66, to reach the line of wheel travel, as 48, than is used where the pattern, as 66, is located further forward of the wheels.

As shown in FIGS. 21-23 and 30 impingement zones 266 and 256 are narrower and tear-drop shaped rather than showing the "D" shaped or semi-elliptical patterns 56 and 66 but, like patterns 56 and 66, the impingement zones 266 and 265 have the necessary length, relation of front central edges, thickness and spacing of their rear edge from the wheels as above discussed.

Table I

| EMBODIMENT 40 DC-8 Super 61* | | |
|---|---|---|
| DIMENSIONS: | | |
| Wing span | 142 ft 5 in | (43.41 m) |
| Length overall (to tail) | 187 ft 5 in | (57.12 m) |
| Height overall (at tail) | 42 ft 5 in | (12.92 m) |
| Wheel track | 20 ft 10 in | (6.35 m) |
| Wheel base | 77 ft 7 in | (23.65 m) |
| Height to axis 105-horizontal to ground 71 | 6 ft ± 4 in | |
| Distance horizontal axis 105 to line 48 | 12 ft 6 in ± 1 ft | |
| Distance horizontal axis 105 to line 120 | 22 ft ± 1 ft | |
| Plate 81 to axis 141 | 13 ft ± 1 ft | |
| WEIGHTS: | | |
| Max T.O. weight | 325,000 lb | (147,415 kg) |
| Operating weight | 148,897 lb | (67,538 kg) |
| OPERATING DATA: | | |
| Performance | 600 mph | (965 km/hr) |
| POWER PLANT: | | |
| Motor-JT3D-3B Turbofan** | | |
| Airflow (6,650 rpm) | 450 lb | (204 kg/sec) |

LITERATURE*
*Jane's All the World's Aircraft. 1972-73. pg 363-364.
**Aircraft Engines of the World. 1970. Wilkinson. pg 101

Table II

EMBODIMENT 240
LOCKHEED L-1011-1 - TRISTAR*

| DIMENSIONS: | | |
|---|---|---|
| Wing span | 155 ft 4 in | (47.34 m) |
| Length overall (to tail) | 178 ft 8 in | (54.35 m) |
| Height overall (at tail) | 55 ft 4 in | (16.87 m) |
| Wheel track | 36 ft 0 in | (10.97 m) |
| Wheel base | 70 ft 0 in | (21.34 m) |
| Height to axis 305-horizontal to ground 71 | 7 ft 6 in | |
| Distance horizontal axis 305 to line 248 | 21 ft | |
| Distance horizontal axis 305 to line 320 | 38 ft | |
| Engine discharge to apex 321 | 11 ft | |
| WEIGHTS: | | |
| Max T.O. weight | 430,000 lb | (195.045 kg) |
| Operating empty weight | 234,275 lb | (106,265 kg) |
| Main wheels | 20 × 50 type VIII, 150-175 psi | |
| OPERATING DATA: | | |
| Stalling speed (cruise configuration) | 190 mph | (306 km/hr) |
| Max level speed (30,000 ft) | Mach 0.9 | |
| POWER PLANT: | | |
| Rolls Royce RB-211-22B** | | |
| Air mass flow (3,787 rpm) | 1,325 lb | (601 kg/sec) |

LITERATURE:
*Jane's All the World's Aircraft, 1969-70, pg 349-350.
**Aircraft Engines of the World, 1972, Wilkinson, pg 138.

I claim:

1. Process of landing an airplane with landing wheels on a solid landing surface covered with a layer of water while passing all of the exhaust gases from two engines of the airplane, each of said two engines located laterally of the fuselage of said airplane with one of said engines in each side of said fuselage, and moving the center of said airplane in a first, longitudinal direction, said process comprising the steps of (1) passing all said exhaust gases directly from said two engines to impinge upon said landing surface at an impingement area extending transversely to said first longitudinal direction, and forming and maintaining a first side portion of a transversely extending and forwardly pointed V-shaped curtain of gas with a front surface that, on one side of said fuselage, extends upwardly from one side of said impingement area on said landing surface to an engine on said one side of said fuselage, said one side of said impingement area being spaced transversely from said one engine and, on the other side of said fuselage, another side portion of said transversely extending V-shaped curtain of gas having a front surface which extends upwardly from another side of said impingement area on said landing surface to a second of said engines on said other side of said fuselage and said other side of said impingement area being spaced transversely from said second engine and, on said one side of said fuselage said front surface of said one side portion of said transversely extending curtain of gas extends centrally and forwardly, from a lateral edge of said impingement area located to the front of and outboard of a first one of said landing wheels of said airplane located on said one side of said fuselage, along a continuous front edge of said impingement area to a front central portion thereof on said landing surface further forward of and central of said first landing wheel and under the fuselage of said airplane, and is there continuous with said another side portion of the front surface of said transversely extending V-shaped curtain of gas on the other side of said fuselage, said another side portion of said front surface of said transversely extending curtain of gas extends forwardly and centrally from a lateral edge of said impingement area located to the front and outboard of a second one of said landing wheels of said airplane located on said other side of said fuselage, along a continuous front edge of said impingement area to a front central area portion thereof on said landing surface further forward of and central of said second landing wheel and under the fuselage of said airplane, said impingement area having, on each side of the fuselage of the airplane, a rear inboard edge which has an outboard portion that is spaced forward of said landing wheel on each side of said fuselage and a central portion located inboard of said landing wheels, (2) displacing the water of said layer of water, by said curtain of gas, from a longitudinally extending path of said wheels and forming a dry surface behind said rear edge of said impingement area of said gas curtain while moving said airplane and gas curtain forward at a sufficiently high rate of speed to maintain said landing wheels in direct contact with said solid landing surface and passing laterally from the lateral edges of said gas curtain, at points lateral of each of said first and second landing wheels, water from said layer of water theretofore in advance of said gas curtain on said solid landing surface.

2. Process as in claim 1 wherein the central portion of the rear inboard edge of the impingement of the gas curtain and the central portion of the front edge of the impingement area of one side of the gas curtain join the central portion of the rear inboard edge of the impingement area of the gas curtain on the other side of the fuselage of said airplane and the central portion of the front edge of the impingement area of the gas curtain on said other side of the fuselage of said airplane, respectively, whereby the front edge of the impingement area of the gas curtain on one side of the fuselage forms a forwardly pointed V-shaped gas curtain impingement area, said impingement area extends centrally and forwardly from an area on said landing surface laterally of said landing wheel located laterally of the fuselage on one side of the fuselage to said V-shaped point of said impingement area and therefrom extends rearwardly and laterally to an area on said solid landing surface located generally and forward of said landing wheel located laterally of said fuselage on the other side of said fuselage.

3. Process as in claim 2 for landing an aircraft on a runway surface covered by a layer of water, comprising the steps of:

(a) making landing approach by said aircraft with said engines on and power thereof reduced from full power and wing flaps in lowered position and said landing wheels in lowered position; then, (b) with the flaps in said lowered position, contact said landing wheels with the wet runway surface with said engines still on; then (c) actuating thrust reverser mechanisms whereby the aircraft speed is substantially slowed;

(d) thereafter, activating exhaust gas stream deflector assemblies, whereby successive increments of the layer of liquid water on the runway surface in front of the landing wheels of the aircraft are successively cleared of said layer of liquid water by said V-shaped transversely extending curtain gas, and (e) applying brakes to the landing wheels and bringing the airplane to a stop.

4. Process as in claim 3 wherein as the airplane speed is slowed said exhaust gas deflector assemblies are tilted and create impingement zones of said gas curtain further outboard then at the position of said impingement zones at the speed of said airplane prior to when said speed is slowed.

5. In an airplane comprising horizontally extending left and right wings with a left inboard jet engine supported by and under the left wing and a right inboard jet engine under the right wing, each engine with a frame therefor, a left landing wheel supported under the left wing inboard of the left engine and a right landing wheel located inboard of the inboard right engine and below the right wing; each of said engines comprising an air intake, compressor blades, a combustion chamber, turbine blades, and said frame, and said frame is firmly attached by an engine support to one of said wings, and said compressor blades and turbine blades are rotatably supported on the engine frame to rotate about a common axis extending horizontally and forwardly; the improvement which comprises that each said engine is operatively connected to a jet engine exhaust gas stream deflector assembly attached to the frame of each said engine said deflector assembly comprises movable deflector plates movably attached to said frame and including, in the operative position of said deflector assembly, imperforate rigid deflector assembly impingement surfaces directed, on the inboard side of each said engine, only downwardly rearwardly and inboard rearwardly, and, one the outboard side of each said engine, only directed rearwardly outboard and rearwardly downwardly, said deflector assembly impingement surface being, in said operative position, in the path of all exhaust gases exiting from said combustion chamber, and an inboard, forwardly and downwardly directed water clearing gas stream and an outboard downwardly and forwardly directed water clearing gas stream, respectively, are directed by said deflector assembly to an inboard initial gas impingement zone and an outboard initial gas impingement zone, said inboard initial gas impingement zone extending in a horizontal plane at the vertical level of the bottom of said landing wheels and located in front of and outboard of the landing wheel inboard of each said engine with a rear edge of each of said zones of inboard initial gas impingement spaced forward of said landing wheel inboard of each said engine and extending outboard and inboard of said wheel and each of said water clearing gas streams extends from said deflector assembly to said gas impingement zones and said impingement zones from each of said engines extend to and are continuous with each other at a line in said horizontal plane halfway between said landing wheels.

6. Apparatus as in claim 5 wherein each of said deflector plates is one of a series of similar clearing deflector plates pivotally mounted on the frame of said engine on the inboard side of said engine and on the outboard side of said engine and said deflector plates are separately pivotally supported on deflector plate axes therefor on both said inboard and outboard sides of said engine and said plates are operatively connected to a control linkage that is operatively connected to a power source therefor and all such deflector plate axes are at an acute angle to the horizontal and, in the clearing deflector plates' operative position, front surfaces of the clearing deflector plates on the outboard side of the engine extend and face an outboard direction and the clearing deflector plates on the inboard side of the engine extend in an inboard facing direction and the forward surfaces of both said inboard and outboard clearing deflector plates are downwardly and rearwardly slanted relative to said common axis of said compressor and turbine blades.

7. Apparatus as in claim 6 wherein each of said jet engines also comprises, on each side of each said engine, cascade type thrust reverser deflector plates, each of the thrust reverser deflector plates being pivotally supported on vertical axes and actuated by a control linkage that turns said thrust reverser deflector plates on said vertical axes and operatively connects to a conventional power source therefor.

8. In an airplane comprising horizontally extending left and right wings with a left inboard jet engine supported by and under the left wing and an inboard right jet engine under the right wing, each engine with a frame therefor, a left landing wheel supported under the left wing inboard of the left engine and a right landing wheel located inboard of the inboard right engine and below the right wing; each of said engines comprising an air intake, compressor blades, a combustion chamber, turbine blades, and said frame, and said frame is firmly attached by an engine support to one of said wings, and said compressor blades and turbine blades are rotatably supported on the engine frame to rotate about a common axis extending horizontally and forwardly; the improvement which comprises that each said engine is operatively connected to a jet engine exhaust gas stream deflector assembly attached to the frame of each said engine and said deflector assembly comprises movable deflector plates movably attached to said frame and including, in the operative position of said deflector assembly, imperforate rigid deflector assembly impingement surfaces directed, on the inboard side of each of said engines, only downward rearwardly and inboard rearwardly, and on the outboard side of each side engine only directed rearwardly outboard and rearwardly downwardly, said deflector assembly impingement surfaces being, in said operative position, in the path of all exhaust gases exiting from said combustion chamber, and an inboard, forwardly and downwardly directed water clearing gas stream and an outboard downwardly and forwardly directed water clearing gas stream, respectively, are directed by said deflector assembly to an inboard initial gas impingement zone an outboard initial gas impingement zone, said inboard initial gas impingement zone extending in a horizontal plane at the vertical level of the bottom of said landing wheels and located in front of and outboard of the landing wheel inboard of each said engine with a rear edge of each of said zones of inboard initial gas impingement spaced forward of said landing wheel inboard of each said engine and extending outboard and inboard of said wheel and each of said water clearing gas streams extends from said deflector assembly to said gas impingement zones and said impingement zones from each of said engines extend to and are continuous with each other at a line in said horizontal plane halfway between said landing wheels, and wherein said engine has a central longitudinal axis and wherein each of said jet exhaust gas deflector assemblies is firmly supported on the frame of one of said jet engines to the rear of the combustion chamber thereof and comprises an inboard deflector plate and an outboard deflector plate, an outboard plate axle and an inboard plate axle and an upper plate jack assembly holds the top edge of said outboard plate in a rearwardly and outboard extending direction and said inboard plate to a rearwardly and inboard extending direction and the lower edges of said deflector plates are located behind the upper edges of said deflector plates with a dihedral angle between the backs of said deflector plates and said deflector plates are each slanted rearward and backward from an upper central forward portion thereof located in a vertical center plane in which plane the central longitudinal axis of said jet engine lies and power means for said upper plate jack assembly is operatively connected to said jack assembly.

9. Apparatus as in claim 8 wherein, in each deflector plate jack assembly,
(a) said axles are rigid and generally extend vertically and are rotatably and firmly mounted and located between a rigid top axle support plate and a rigid bottom axle support plate and said axles are firmly fixed to said inboard side deflector plate and said outboard side deflector plate and said plates are rigid and formed of high temperature-resistant alloy and concave inward, and
(b) the top of each of said axles is supported in a joint and the upper plate jack assembly and said upper plate jack assembly comprises an upper axle control link train assembly, and an upper movable piston and an upper piston cylinder, and said top of each of said axles is connected to one rear end of the upper axle control link train assembly and the front end of such upper link train assembly is firmly attached to the rear end of said upper movable piston, said upper piston being movable within said upper piston cylinder and said upper piston cylinder is firmly attached to the top of said jet engine frame; and
(c) a lower link train, a lower movable piston and lower piston cylinder form a lower jack assembly and bottom ends of said axles are movably held in guide slots in a rigid lower bottom axle support plate and said lower link train connects the bottom ends of said axles to the movable rear end of the lower portion of said lower piston jack assembly and said lower piston cylinder is firmly attached to the lower bottom axle support plate and, therethrough, to said jet engine frame.

* * * * *